United States Patent
Iida (12) 
(10) Patent No.: US 11,699,313 B2
(45) Date of Patent: Jul. 11, 2023

(54) SMART KEY STORAGE CASE FOR VEHICLE

(71) Applicant: Mamoru Iida, Fukui (JP)

(72) Inventor: Mamoru Iida, Fukui (JP)

(*) Notice: Subject to any disclaimer, the term of this patent is extended or adjusted under 35 U.S.C. 154(b) by 285 days.

(21) Appl. No.: 17/294,163

(22) PCT Filed: Dec. 9, 2020

(86) PCT No.: PCT/JP2020/045896
§ 371 (c)(1),
(2) Date: May 14, 2021

(87) PCT Pub. No.: WO2021/131713
PCT Pub. Date: Jul. 1, 2021

(65) Prior Publication Data
US 2022/0058899 A1 Feb. 24, 2022

(30) Foreign Application Priority Data
Dec. 24, 2019 (JP) .................... 2019-232914

(51) Int. Cl.
*G07C 9/00* (2020.01)

(52) U.S. Cl.
CPC ............ *G07C 9/00309* (2013.01); *G07C 2009/00769* (2013.01)

(58) Field of Classification Search
None
See application file for complete search history.

(56) References Cited

U.S. PATENT DOCUMENTS

2012/0019360 A1* 1/2012 McGinn ............ G07C 9/00912
340/5.73
2017/0190318 A1 7/2017 Imamura

FOREIGN PATENT DOCUMENTS

| JP | 2011254634 A | 12/2011 |
|---|---|---|
| JP | 2016030919 A | 3/2016 |
| JP | 2019073206 A | 5/2019 |
| JP | 2019203329 A | 11/2019 |

OTHER PUBLICATIONS

International Search Report dated Mar. 16, 2021 for corresponding International Application No. PCTJP2020/045896, dated Dec. 9, 2020.

* cited by examiner

Primary Examiner — Carlos Garcia
(74) Attorney, Agent, or Firm — David D. Brush; Westman, Champlin & Koehler, P.A.

(57) ABSTRACT

A smart key storage case includes a storage case main body that can shield a signal, a transmission path through which a call signal from an in-vehicle device is radiated into the storage case main body, a switch that conducts/cuts off the transmission path, a radio communication unit that performs data communication with a radio communication terminal, a controller that controls the switch, and a response signal relay section that radiates a response signal from the smart key inside the storage case main body to the outside. When the radio communication terminal is present outside the vehicle, the controller controls the switch so that the call signal transmitted from the in-vehicle device to the inside of the cabin is cut off and the call signal transmitted to the outside of the vehicle is transmitted.

4 Claims, 6 Drawing Sheets

SMART KEY STORAGE CASE FOR VEHICLE

CROSS-REFERENCE TO RELATED APPLICATION

The present application is a Section 371 National Stage Application of International Application No. PCT/JP2020/045896, filed Dec. 9, 2020, not yet published, which claims priority based on Japanese Patent Application No. 2019-232914 filed with the Japanese Patent Office on Dec. 24, 2019, and the entire contents of which are incorporated herein by reference in their entireties.

TECHNICAL FIELD

The present disclosure relates to a storage case that stores a smart key of a vehicle.

BACKGROUND ART

Patent Document 1 describes a system in which an in-vehicle device periodically transmits a call signal, and a portable device that has received the call signal transmits a response signal.

This system is also referred to as a smart entry system, and an in-vehicle device authenticates a portable device (hereinafter, referred to as a smart key) from a response signal and controls unlocking and locking of a vehicle based on an authentication result.

In this system, a so-called relay attack may be performed in which a repeater relaying a call signal to a smart key away from the vehicle causes the smart key to transmit a response signal to illegally unlock the vehicle.

Therefore, Patent Document 1 describes that a relay attack is determined by transmitting a call signal including a measurement signal from a plurality of transmission antennas disposed at different positions of a vehicle and receiving the call signal by a three-axis antenna at the smart key.

That is, in the system described in Patent Document 1, the smart key measures the reception strength of the measurement signal transmitted from the plurality of transmission antennas of the in-vehicle device for each axis. Then, the degree of similarity of the reception strength of each axis of the measurement signal is obtained, and it is determined from the degree of similarity whether the relay attack has been performed.

Therefore, in the system described in Patent Document 1, the smart key can determine that the relay attack has been performed not to transmit the response signal, so that it is possible to prevent the vehicle from being stolen due to the relay attack.

PRIOR ART DOCUMENT

Patent Document

Patent Document 1: Japanese Unexamined Patent Application Publication No. 2019-203329

SUMMARY OF THE INVENTION

Problems to be Solved by the Invention

However, in the countermeasure described in Patent Document 1, it is necessary for the in-vehicle device to transmit a call signal including a measurement signal via a plurality of transmission antennas, and for the smart key to obtain a degree of similarity in reception strength of the measurement signal received by the three-axis antenna. For this reason, in order to realize the system described in Patent Document 1, it is necessary to change an in-vehicle device and a smart key to ones for preventing a relay attack, and the system cannot be applied to an existing keyless entry system.

A smart key storage case for a vehicle according to an aspect of the present disclosure can suppress theft of the vehicle due to a relay attack without improving an in-vehicle device or a smart key used in an existing keyless entry system.

Means for Solving the Problems

A smart key storage case for a vehicle according to an aspect of the present disclosure stores a smart key, which is a portable device of a keyless entry system of a vehicle, in a cabin of the vehicle, and includes a storage case main body configured to store the smart key. The storage case main body is configured to shield a signal transmitted and received between the in-vehicle device and the smart key of the keyless entry system.

In addition, the smart key storage case of the present disclosure includes a reception antenna, a transmission antenna, a transmission path, a switch, a radio communication unit, a controller, and a response signal relay section.

Here, the reception antenna is disposed outside the storage case main body, and is configured to receive call signals periodically transmitted from the in-vehicle device to the outside of the vehicle and the inside of the cabin at different timings.

Further, the transmission antenna is disposed inside the storage case main body, and is configured to radiate the call signal received by the reception antenna to the inside of the storage case main body, and the transmission path is configured so that the call signal received by the reception antenna is transmitted therethrough to the transmission antenna.

Therefore, the reception antenna, the transmission antenna, and the transmission path function as a call signal relay section that relays a call signal from the outside to the inside of the storage case main body. The transmission path is provided with a switch configured to switch a conduction/cutoff state of the transmission path.

Next, the radio communication unit is configured to enable data communication with a portable radio communication terminal registered in advance outside the storage case main body. Then, when the predetermined data transmitted from the radio communication terminal is received by the radio communication unit, the controller is configured to turn on the switch and switch the transmission path from the cutoff state to the conduction state according to a reception situation of the received predetermined data.

The response signal relay section is configured to radiate, inside the storage case main body, a response signal transmitted from the smart key in response to the call signal radiated from the transmission antenna to the outside of the storage case main body.

As described above, the smart key storage case of the present disclosure is configured so that the storage case main body can shield a signal transmitted and received between the in-vehicle device and the smart key of the keyless entry system. Therefore, when the smart key is stored inside the storage case main body, it is possible to prevent the call signal transmitted from the in-vehicle device from directly reaching the smart key.

When the user carrying the radio communication terminal registered in the radio communication unit approaches the vehicle and the radio communication unit receives the predetermined data transmitted from the radio communication terminal, the controller turns on the switch to switch the transmission path from the cutoff state to the conduction state according to the reception situation.

Then, when the switch is turned on by the controller, the call signal transmitted from the in-vehicle device and received by the reception antenna is transmitted to the transmission antenna via the transmission path and radiated from the transmission antenna to the inside of the storage case main body.

As a result, the smart key receives the call signal to transmit the response signal, and the response signal is radiated to the outside of the storage case main body by the response signal relay section. Therefore, the in-vehicle device can control unlocking and locking of the vehicle based on the response signal.

As described above, according to the smart key storage case of the present disclosure, the smart key can transmit the response signal only when the radio communication unit receives the predetermined data from the radio communication terminal registered in advance.

Therefore, illicit control of the in-vehicle device due to a relay attack or the like can be suppressed. In addition, as long as the user possesses the radio communication terminal, the user does not need to carry the smart key, and thus, it is possible to suppress the smart key from being stolen and illegally used.

Since the portable radio communication terminal is only required to be able to perform predetermined data communication with the radio communication unit, the radio communication terminal usually carried by a user, such as a mobile phone or a smartphone, can be used. By setting the communication method of data communication to a communication method that requires mutual authentication and has high communication safety, it is possible to more reliably suppress illicit control of the in-vehicle device of the keyless entry system.

The smart key transmits a response signal for permitting unlocking/locking of the vehicle to a call signal transmitted from the in-vehicle device to the outside of the vehicle, and transmits a response signal for permitting starting of the engine of the vehicle to a call signal transmitted from the in-vehicle device to the inside of the cabin.

That is, in the keyless entry system, the in-vehicle device transmits the call signal to the outside of the vehicle for a certain period of time, and then transmits the call signal to the inside of the cabin. In this manner, the in-vehicle device alternately and periodically transmits the call signal to the outside of the vehicle and the inside of the cabin in a predetermined transmission pattern.

Then, the smart key determines whether the smart key is located inside the cabin or outside the vehicle based on the call signal transmitted from the in-vehicle device to the outside of the vehicle or the inside of the cabin to transmit the response signal.

For this reason, when the call signal received in the cabin by the reception antenna is transmitted to the transmission antenna as it is via the transmission path, the smart key does not transmit the response signal for permitting the in-vehicle device to unlock/lock the vehicle. As a result, control of unlocking/locking the vehicle by the in-vehicle device cannot be performed.

Therefore, when switching the transmission path to the conduction state by turning on the switch, the controller first identifies whether the radio communication terminal is present outside the vehicle or inside the cabin based on the signal strength of the reception signal when the radio communication unit receives the predetermined data.

When the radio communication terminal is present inside the cabin, the controller turns on the switch to switch the transmission path from the cutoff state to the conduction state.

As a result, when the radio communication terminal is present in the inside of the cabin, the call signal received by the reception antenna is radiated to the inside of the storage case main body as it is. Therefore, the smart key determines based on the signal strengths and the like of the two types of call signals that the smart key is present in the cabin to transmit a response signal for permitting the start of the engine.

Therefore, although the user can start/stop the engine by operating the start button of the engine, the user cannot perform unlocking/locking by operating the unlock/lock switching button for the keyless entry system outside the vehicle.

On the other hand, when the radio communication terminal is present outside the vehicle, the controller controls the on/off state of the switch so that the call signal transmitted from the in-vehicle device to the inside of the cabin is cut off and the call signal transmitted from the in-vehicle device to the outside of the vehicle is selectively transmitted.

Therefore, in this case, only the call signal transmitted to the outside of the vehicle of the call signals transmitted from the in-vehicle devices is radiated to the inside of the storage case main body, and the call signal transmitted to the inside of the cabin is not radiated.

Therefore, when the radio communication terminal is present outside the vehicle, the smart key transmits a response signal for permitting unlocking/locking of the vehicle in response to a call signal transmitted from the in-vehicle device to the outside of the vehicle. Therefore, the user can unlock/lock the vehicle by operating the unlock/lock switching button for the keyless entry system outside the vehicle.

Therefore, according to the smart key storage case of the present disclosure, it is possible not only to suppress illicit control of the in-vehicle device due to a relay attack or the like, but also to normally operate the keyless entry system using the radio communication terminal owned by the user.

Here, when the radio communication terminal is present outside the vehicle, the controller may be configured as follows in order to selectively transmit only the call signal transmitted from the in-vehicle device to the inside of the cabin of the call signals received by the reception antenna in the transmission path.

That is, the controller may be configured to detect the signal strength of the call signal received by the reception antenna, and turn on the switch when the signal strength is equal to or less than a predetermined threshold value and turn off the switch when the signal strength exceeds the predetermined threshold value.

That is, when the radio communication terminal is present outside the vehicle, the call signal transmitted from the in-vehicle device to the inside of the cabin of the call signals received by the reception antenna has a higher signal strength than the call signal transmitted from the in-vehicle device to the outside of the vehicle.

Therefore, when the controller turns off the switch when the signal strength of the call signal received by the reception antenna exceeds the threshold value, transmission of the call signal transmitted from the in-vehicle device to the inside of the cabin through the transmission path can be suppressed.

Next, the controller may be configured to recognize a transmission period of the call signal from the in-vehicle device to the inside of the cabin from the reception pattern of the call signal received by the reception antenna, turn off the switch within the transmission period, and turn on the switch outside the transmission period.

That is, in the keyless entry system, the in-vehicle device periodically transmits call signals to the outside of the vehicle and the inside of the cabin at different timings. Therefore, when the radio communication terminal is present outside the vehicle, the call signals transmitted to the outside of the vehicle and the inside of the cabin can be identified from the reception pattern of the call signal received by the reception antenna.

Therefore, also when the controller recognizes the transmission period of the call signal from the in-vehicle device to the inside of the cabin from the reception pattern of the call signal and turns off the switch during the transmission period, the same effect as described above can be obtained.

On the other hand, the smart key storage case of the present disclosure may include, as the reception antenna, a first reception antenna disposed at a position where the call signal transmitted from the in-vehicle device to the outside of the vehicle and the inside of the cabin can be received, and a second reception antenna disposed at a position where only the call signal transmitted from the in-vehicle device to the inside of the cabin can be received, and may include, as the switch, a first switch provided on a first transmission path through which the call signal received by the first reception antenna is transmitted to the transmission antenna, and a second switch provided on a second transmission path through which the call signal received by the second reception antenna is transmitted to the transmission antenna.

In this case, the controller may be configured to, when the radio communication terminal is present inside the cabin, turn off the first switch and turn on the second switch to transmit the call signal in the cabin received by the second reception antenna to the transmission antenna, and when the portable radio terminal is present outside the vehicle, turn off the second switch, and turn off the first switch during a reception period in which the call signal in the cabin is received by the second reception antenna and turn on the first switch outside the reception period.

In this way, when the radio communication terminal is present outside the vehicle, the call signal transmitted from the in-vehicle device to the outside of the vehicle can be selectively transmitted to the transmission antenna, and the same effect as described above can be obtained.

EXPLANATION OF REFERENCE NUMERALS 1 keyless entry system
2 vehicle
4 cabin
10 in-vehicle device
20 smart key
30 smart key storage case
32 storage case main body
40 relay unit
22 reception antenna
24 transmission antenna
26 transmission path
42, 43 reception antenna
44 transmission antenna
46, 47 transmission path
48, 50 switch
60 controller
70 radio communication unit
80 radio communication terminal

DETAILED DESCRIPTION OF THE EMBODIMENTS

Exemplary embodiments of the present disclosure will be described below with reference to the drawings.

First Embodiment

Figure 1:
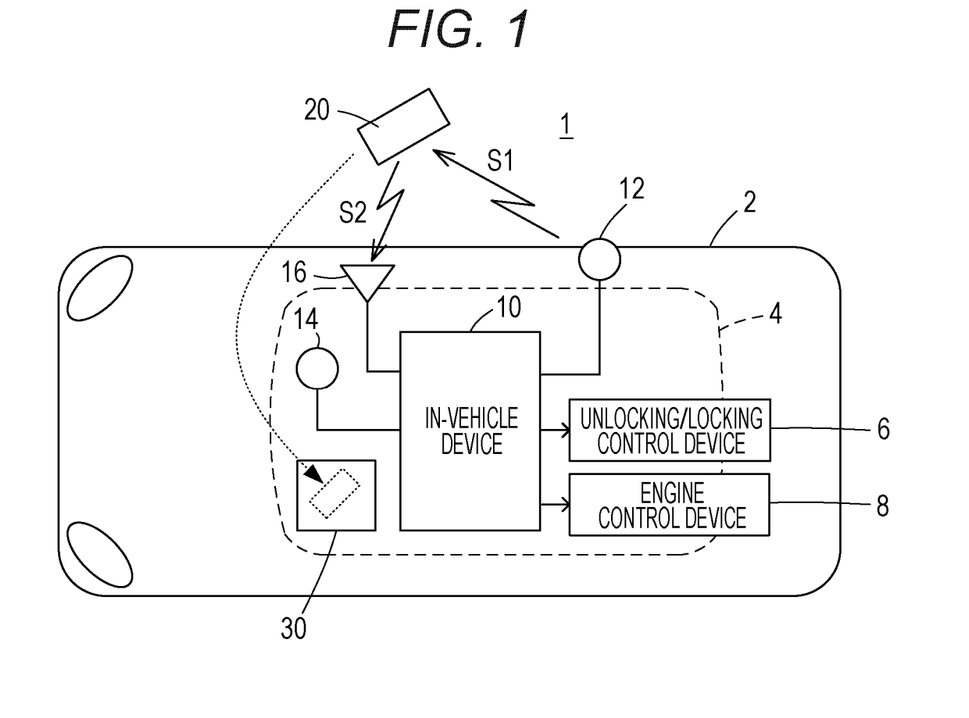
FIG. 1 is an explanatory diagram illustrating a configuration of an entire keyless entry system including a smart key storage case according to a first embodiment.

As illustrated in FIG. 1, a keyless entry system 1 of the present embodiment includes an in-vehicle device 10 mounted on a vehicle 2 and a smart key 20 that is a portable device that communicates with the in-vehicle device 10.

In the keyless entry system 1, the in-vehicle device 10 transmits a call signal S1 to the smart key 20 of the host vehicle via antennas 12 and 14, and the smart key 20 transmits a response signal S2 corresponding to the call signal S1.

Further, the in-vehicle device 10 receives the response signal S2 from the smart key 20 of the host vehicle via an antenna 16, and determines whether the smart key 20 is located outside the vehicle 2 or inside a cabin 4 from the response signal S2.

When the smart key 20 is located outside the vehicle 2, the in-vehicle device 10 receives the response signal S2 to output a permission signal for permitting the unlocking/locking of the door to a control device 6 that unlocks or locks the lock mechanism of the door of the vehicle 2.

The door is unlocked/locked by an unlocking/locking control device 6 when a user operates an unlocking/locking switching button provided on the driver's seat or a rear door. Then, the in-vehicle device 10 outputs the permission signal to permit the control device 6 to unlock or lock the lock mechanism.

When the smart key 20 is located in the cabin 4, the in-vehicle device 10 receives the response signal S2 from the smart key 20 of the host vehicle, thereby permitting an engine control device 8 of the vehicle 2 to start or stop the engine in response to the operation of the start switch by the driver.

The start switch is provided near the driver's seat, and is used to start or stop the engine by the driver operating the start switch.

Next, the in-vehicle device 10 transmits the call signal S1 to the outside of the vehicle 2 via the antenna 12, and transmits the call signal S1 to the inside of the cabin 4 via the antenna 14 so that it can be identified whether the smart key 20 is located outside the vehicle 2 or inside the cabin 4.

Note that the frequency of the call signal S1 transmitted from each of the antennas 12 and 14 is set to a long wavelength band of 30 to 300 kHz (so-called LH band), and each of the antennas 12 and 14 is composed of a coil antenna so as to be able to transmit the call signal S1 in the long wavelength band.

Further, the in-vehicle device 10 transmits the call signal S1 to the outside of the vehicle 2 for a certain period of time, and then transmits the call signal to the inside of the cabin 4. In this manner, the in-vehicle device alternately periodically transmits the call signal S1 from each of the antennas 12 and 14 to the outside of the vehicle 2 and the inside of the cabin 4 in a predetermined transmission pattern.

On the other hand, the smart key 20 recognizes whether the smart key 20 exists outside the vehicle 2 or inside the cabin 4 based on the reception situation of the call signal transmitted from each of the antennas 12 and 14. Then, the smart key 20 transmits the response signal S2 that permits unlocking/locking of the door or starting/stopping of the engine according to the recognition result.

As a result, the in-vehicle device 10 can switch between permitting unlocking/locking of the door and permitting starting/stopping of the engine according to the response signal S2 transmitted from the smart key 20.

Even when the smart key 20 is away from the vehicle 2 and is located at a position where the call signal S1 does not reach, when the call signal S1 transmitted from the in-vehicle device 10 to the outside of the vehicle 2 is transmitted to the smart key 20 using a repeater, the smart key 20 transmits the response signal S2.

Since the frequency of the response signal S2 is set in the ultra-high frequency band (so-called UHF band) of the 0.3 to 3 GHz band, the response signal S2 transmitted from the smart key 20 may reach the in-vehicle device 10, and the in-vehicle device 10 may permit the door to be unlocked/locked in accordance with the response signal S2.

In this manner, the act of transmitting the call signal S1 transmitted from the in-vehicle device 10 to the outside of the vehicle 2 to the smart key 20 away from the vehicle 2 using the repeater and permitting the in-vehicle device 10 to unlock/lock the door is referred to as the relay attack described above, and is an illicit act for stealing the vehicle 2.

Therefore, in the present embodiment, in order to prevent such an illicit act from being performed, a smart key storage case 30 can be provided in the cabin 4 of the vehicle 2, and the smart key 20 can be stored in the smart key storage case 30.

Figure 2:
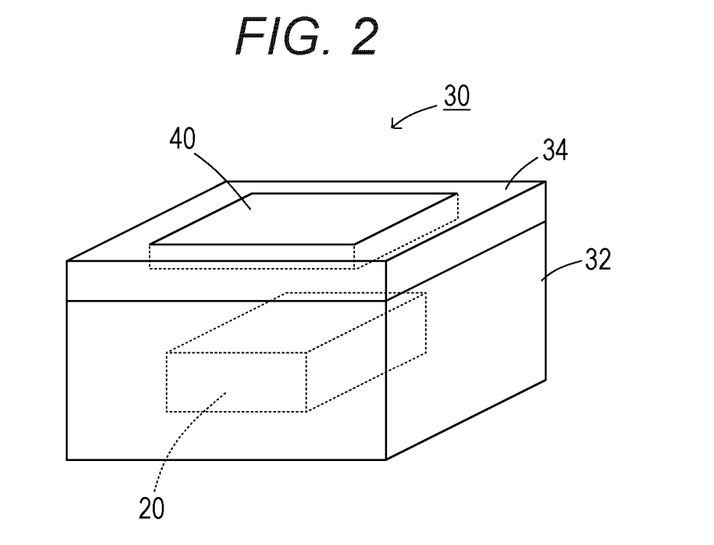
FIG. 2 is an explanatory diagram illustrating an appearance of the smart key storage case.

The smart key storage case 30 has an opening at a portion (upper side in the drawing), and includes a storage case main body 32 including a lid portion 34 for closing the opening so that the smart key 20 can be stored from the outside.

In FIG. 2, the storage case main body 32 has a rectangular box shape, but the storage case main body 32 may have any shape as long as the internal space can be closed by the lid portion 34 and the smart key 20 can be stored therein. For example, the storage case main body may have any shape such as a circular or elliptical box shape.

The storage case main body 32 including the lid portion 34 is made of a material containing a ferromagnetic material such as iron so as to shield the call signal S1 and the response signal S2 transmitted and received between the in-vehicle device 10 and the smart key 20.

Therefore, when the smart key 20 is stored in the storage case main body 32, the smart key 20 cannot receive the call signal S1 from the in-vehicle device 10 and does not transmit the response signal S2, so that the vehicle 2 can be prevented from being stolen by the relay attack described above.

However, simply storing the smart key 20 in the storage case main body 32 and providing the smart key in the cabin 4 make it possible to suppress an illicit act due to a relay attack, but the smart key 20 cannot be used as a portable device of the keyless entry system 1.

Therefore, a relay unit 40 that radiates the call signal S1 from the in-vehicle device 10 to the inside of the storage case main body 32 and radiates the response signal S2 from the smart key 20 to the outside of the storage case main body 32 is provided outside the storage case main body 32 (the lid portion 34 in the figure).

Figure 3:
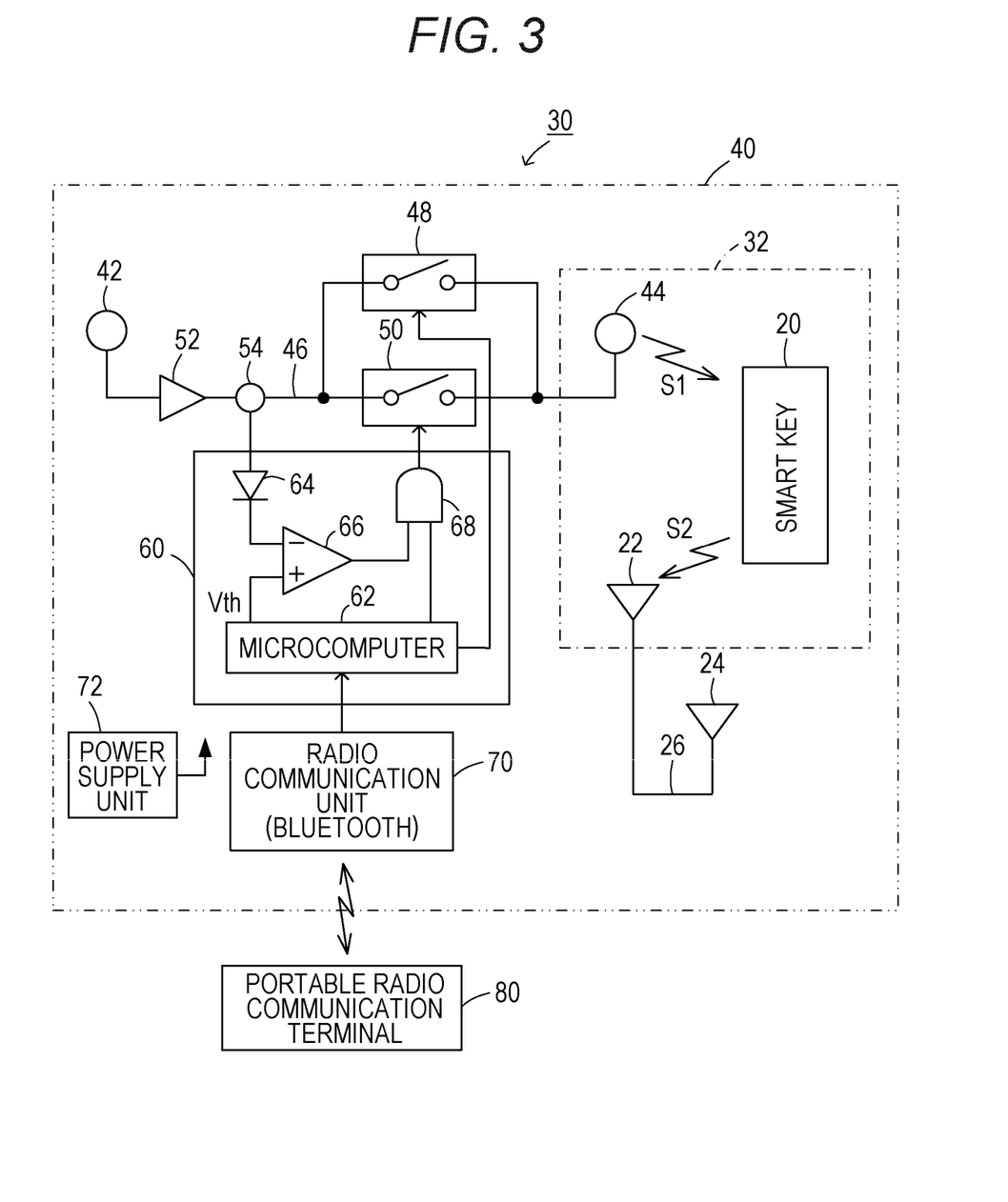
FIG. 3 is a block diagram illustrating a configuration of a relay unit.

As illustrated in FIG. 3, the relay unit 40 as a response signal relay section that radiates the response signal S2 from the smart key 20 to the outside of the storage case main body 32 includes a reception antenna 22, a transmission antenna 24, and a transmission path 26.

The reception antenna 22 is provided inside the storage case main body 32 so as to be able to receive the response signal S2 transmitted from the smart key 20. In addition, the transmission antenna 24 is provided outside the storage case main body 32 so that be able to radiate the response signal S2 received by the reception antenna 22 toward the antenna 16.

The reception antenna 22 and the transmission antenna 24 are composed of small UHF antennas so as to be able to transmit and receive the response signal S2 in the ultra-high frequency band. The antenna 16 provided in the in-vehicle device 10 is configured similarly to the antennas 22 and 24.

The transmission path 26 is composed of a coaxial cable or the like capable of transmitting the response signal S2 in the ultra-high frequency band, and transmits the response signal S2 received by the reception antenna 22 to the transmission antenna 24 to radiate the response signal S2 from the transmission antenna 24.

Further, the relay unit 40 as a call signal relay section that radiates the call signal S1 from the in-vehicle device 10 to the inside of the storage case main body 32 includes a reception antenna 42, a transmission antenna 44, and a transmission path 46.

The reception antenna 42 is provided outside the storage case main body 32 so as to be able to receive the call signals S1 periodically transmitted from the antennas 12 and 14 of the in-vehicle device 10 to the outside of the vehicle 2 and the inside of the cabin 4 at different timing.

In addition, the transmission antenna 44 is provided inside the storage case main body 32 so that be able to radiate the call signal S1 received by the reception antenna 42 to the inside of the storage case main body 32.

As in the antennas 12 and 14, the reception antenna 42 and the transmission antenna 44 are composed of a coil antenna or the like capable of transmitting and receiving a signal in a long wavelength band.

In addition, the transmission path 46 is a path through which the call signal S1 received by the reception antenna 42 is transmitted to the transmission antenna 44. The transmission path 46 is provided with switches 48 and 50 configured to switch the conduction/cutoff states of the transmission path 46.

The switches 48 and 50 are composed of electronic switches capable of switching between on and off states by a driving signal. Then, these switches 48 and 50 are connected in parallel to each other so as to make the transmission path 46 in the conduction state to transmit the call signal S1 when at least one of the switches is in the on state.

Note that the switches 48 and 50 are turned on when the driving signal is at a high level, and are turned off when the driving signal is at a low level.

Furthermore, an amplifier 52 that amplifies the call signal S1 received by the reception antenna 42 and a branching unit 54 that branches part of the call signal S1 amplified by the amplifier 52 are provided in the transmission path 46 between the switches 48 and 50 and the reception antenna 42.

Next, the relay unit 40 includes a controller 60 that controls on/off states of the switches 48 and 50, a radio communication unit 70 that performs radio communication with a portable radio communication terminal 80, and a power supply unit 72 that supplies power to these units.

The power supply unit 72 receives power from a battery provided in the relay unit 40 or an in-vehicle battery to generate a power supply voltage (DC constant voltage) to be supplied to the controller 60, the radio communication unit 70, the amplifier 52, and the like.

In addition, the radio communication unit 70 is configured to perform radio communication by Bluetooth (registered trademark), which is a communication method capable of performing mutual authentication, with the radio communication terminal 80 registered in advance as the communication target device.

Examples of the external radio communication terminal 80 include a portable radio communication terminal owned by a user of the vehicle 2, specifically, a mobile phone, a smartphone, a tablet terminal, or the like.

When the registered radio communication terminal 80 approaches the radio communication unit 70 and it is possible to perform radio communication, the radio communication unit 70 performs data communication with the radio communication terminal 80. In addition, the radio communication unit 70 is configured to be able to detect a reception level of a radio signal at the time of data communication with the radio communication terminal 80.

Next, the controller 60 includes a detector 64 that detects a signal level by performing envelope detection on the call signal S1 branched by the branching unit 54, and a comparator 66 that compares the signal level of the call signal S1 output from the detector 64 with a threshold value Vth.

The comparator 66 is configured to output a signal that is at a low level when the signal level of call signal S1 is equal to or higher than threshold value Vth, and is at a high level when the signal level of call signal S1 is lower than threshold value Vth. Then, the signal from the comparator 66 is input to one input terminal of an AND circuit 68.

The AND circuit 68 generates a driving signal for the switch 50. That is, when the signal from the comparator 66 is at the high level and the control signal input to the other input terminal is at the high level, the AND circuit 68 outputs the high level signal as the driving signal of the switch 50.

As a result, the switch 50 is turned on when the signal level of the call signal S1 is lower than the threshold value Vth and the control signal is at the high level, and is turned off when the signal level of the call signal S1 is equal to or higher than the threshold value Vth.

The controller 60 includes a microcomputer 62 that generates and outputs a control signal input to the AND circuit 68, the threshold value Vth input to the comparator 66, and a driving signal for turning on the switch 48.

Figure 4:
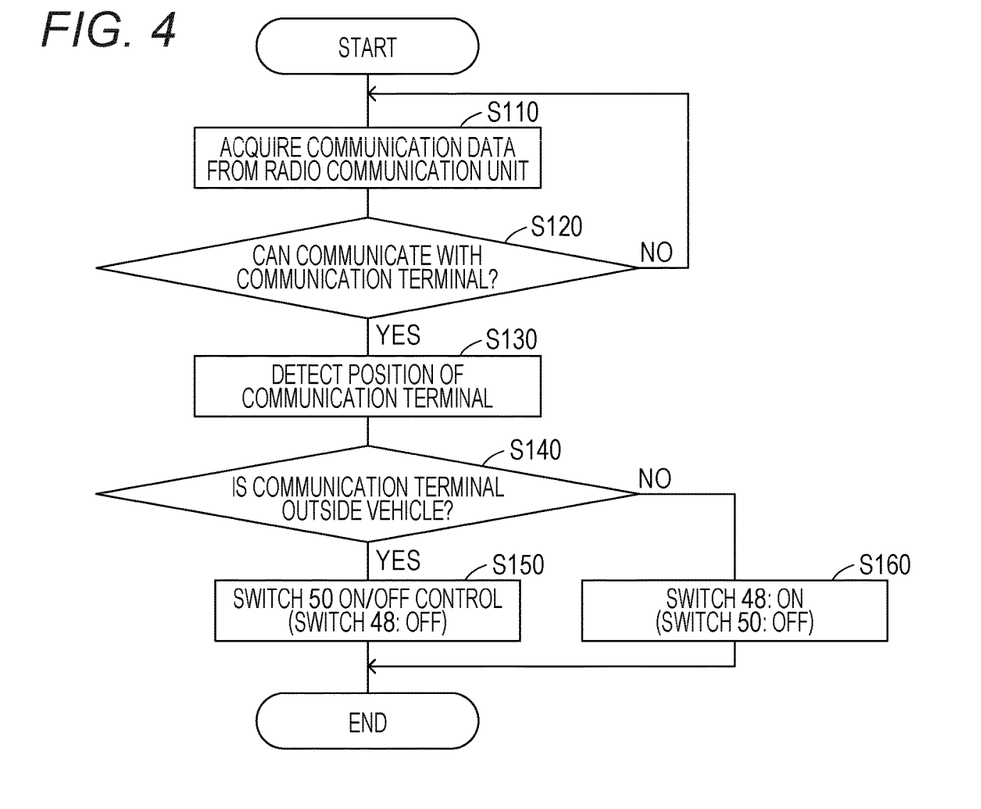
FIG. 4 is a flowchart illustrating control processing executed by a controller.

The microcomputer 62 is a known microcomputer including a CPU, a ROM, a RAM, and the like, and executes control processing illustrated in FIG. 4 according to a program stored in the ROM.

In this control processing, the microcomputer 62 first acquires communication data with the registered radio communication terminal 80 from the radio communication unit 70 in S110, and proceeds to the process of S120.

In S120, from the communication data acquired in S110, it is determined whether the radio communication with the radio communication terminal 80 is performed, that is, whether the registered radio communication terminal 80 within the communicable range by Bluetooth (registered trademark) is present.

When it is determined in S120 that the radio communication with the radio communication terminal 80 is performed, the processing proceeds to S130. Otherwise, the processing returns to S110 and waits until the radio communication is performed with the radio communication terminal 80.

Next, in S130, a signal level of the reception signal from the radio communication terminal 80 is acquired from the radio communication unit 70, and position detection processing of identifying whether the radio communication terminal 80 is located outside the vehicle 2 or inside the cabin 4 is performed based on the signal level.

That is, when the signal level of the reception signal is high, the radio communication terminal 80 is determined to be located inside the cabin 4, and when the signal level of the reception signal is low, the radio communication terminal 80 is determined to be located outside the vehicle 2.

Then, in subsequent S140, it is determined from the position detection result in S130 whether the radio communication terminal 80 is located outside the vehicle 2. When the radio communication terminal 80 is located outside the vehicle 2, the processing proceeds to S150. Otherwise, the processing proceeds to S160.

In S150, since the radio communication terminal 80 is located outside the vehicle 2, the switch 48 is turned off so that the call signal radiated from the in-vehicle device 10 to the inside of the cabin 4 does not reach, and on/off control of the switch 50 is performed.

Specifically, by outputting a preset threshold value Vth to the comparator 66 and outputting a high-level control signal to the AND circuit 68, the switch 50 is turned on when the signal level of the call signal S1 is lower than the threshold value Vth.

In order to cut off the call signal S1 transmitted from the in-vehicle device 10 to the inside of the cabin 4 in the transmission path 46, the on/off control of the switch 50 is performed when the radio communication terminal 80 is located outside the vehicle 2 as described above.

Figure 5:
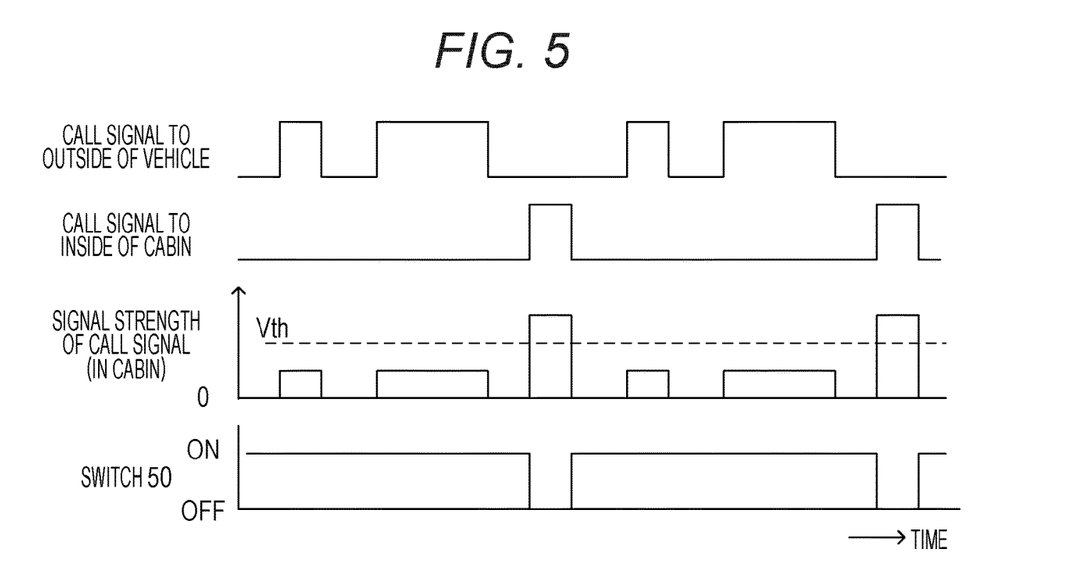
FIG. 5 is a time chart illustrating a call signal transmitted from an in-vehicle device, a change in signal strength in a cabin, and a state change of a switch.

That is, the call signal S1 transmitted from the in-vehicle device 10 to the outside of the vehicle 2 and the inside of the cabin 4 via the antennas 12 and 14 is periodically transmitted alternately in a predetermined transmission pattern as illustrated in FIG. 5.

Then, when the call signal S1 is received by the reception antenna 42 in the cabin 4, the signal level of the call signal S1 transmitted to the inside of the cabin 4 is high, and the signal level of the call signal S1 transmitted to the outside of the vehicle 2 is low.

This is because the call signal S1 transmitted to the outside of the vehicle 2 enters the cabin 4 through the windshield, the rear glass, the door glass, and the like of the vehicle 2, and is attenuated due to these objects.

In order for the user carrying the radio communication terminal 80 to unlock/lock the door from the outside of the vehicle 2, the call signal S1 transmitted to the outside of the vehicle 2 is required to reach the smart key 20 at a higher level than the call signal S1 transmitted to the cabin 4.

Therefore, in the present embodiment, by turning off the switch 50 when the signal level of the call signal S1 received by the reception antenna 42 is equal to or higher than the threshold value Vth, the call signal S1 transmitted to the outside of the vehicle 2 is selectively input to the smart key 20.

As a result, the smart key 20 transmits the response signal S2 corresponding to the call signal S1 transmitted to the outside of the vehicle 2, and the in-vehicle device 10 permits the unlocking/locking control device 6 to lock/unlock the door according to the response signal S2.

On the other hand, in S160, since the radio communication terminal 80 is located inside the cabin 4, the control signal output to the AND circuit 68 is set to the low level to turn off the switch 50, and the driving signal is output to the switch 48 to turn on the switch 48.

Note that the processes of S150 and S160 are executed for a predetermined time, and after the lapse of the predetermined time, the processing proceeds to S110 to execute the processes of S110 and subsequent steps again. That is, the microcomputer 62 repeatedly executes the processes of S110 to S160 at predetermined time intervals.

In the process of S160, the call signal S1 received by the reception antenna 42 is transmitted from the transmission antenna 44 as it is, and the smart key 20 recognizes that the smart key 20 is in the cabin 4 from the reception pattern and the signal level of the call signal S1.

Therefore, the smart key 20 transmits the response signal S2 that permits starting/stopping of the engine, and the response signal S2 is radiated to the inside of the cabin 4 via the response signal relay section including the reception antenna 22, the transmission path 26, and the transmission antenna 24.

Then, the in-vehicle device 10 permits the engine control device 8 to start/stop the engine in accordance with the operation of the start switch according to the response signal S2 radiated to the inside of the cabin 4.

Therefore, according to the smart key storage case 30 of the present embodiment, not only illicit control of the in-vehicle device 10 due to a relay attack or the like can be suppressed, but also the keyless entry system 1 can be normally operated using the radio communication terminal 80 possessed by the user.

Second Embodiment

Next, a smart key storage case 30 according to a second embodiment will be described.

Figure 6:
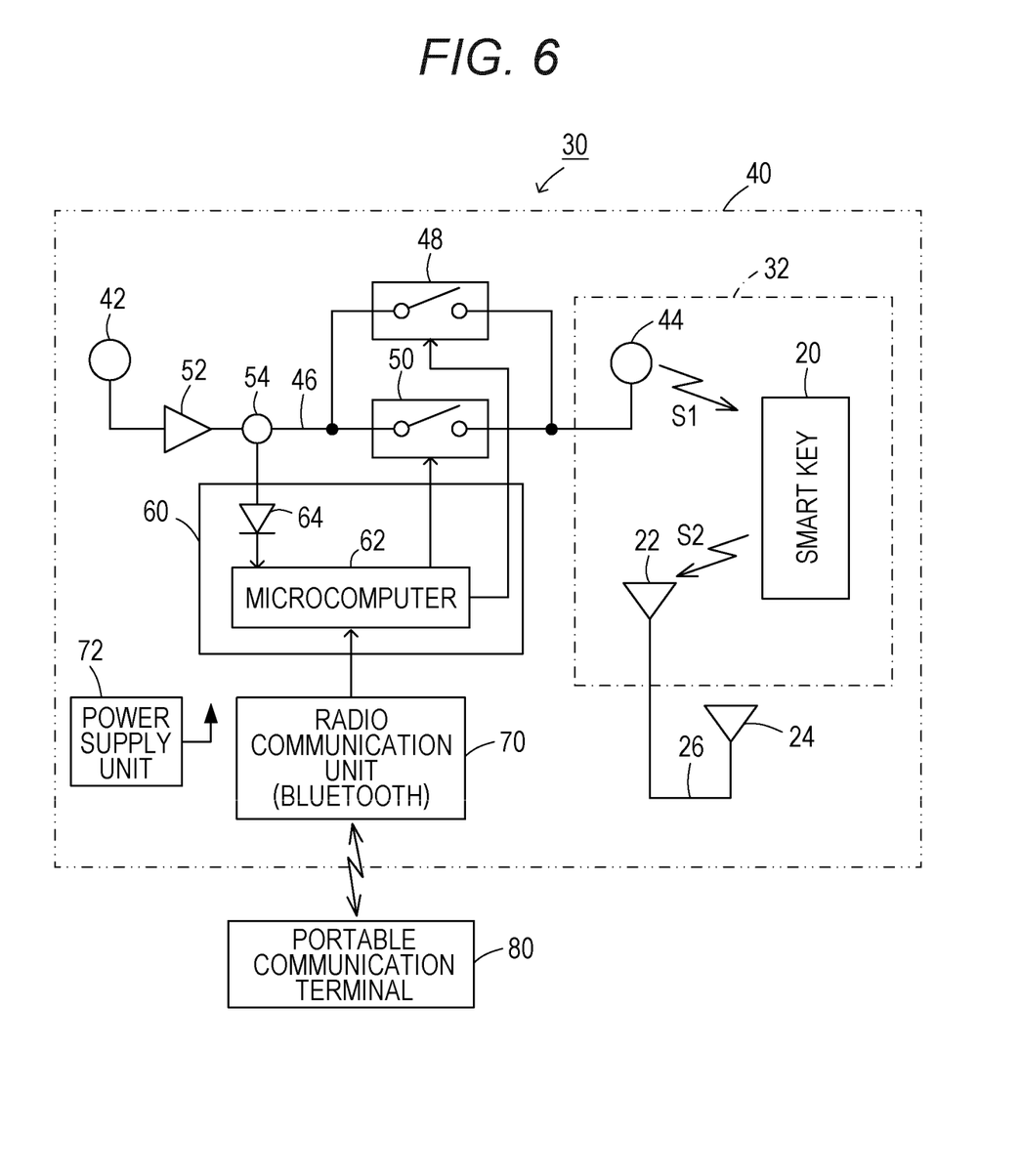
FIG. 6 is a block diagram illustrating a configuration of a relay unit of a second embodiment.

As illustrated in FIG. 6, the smart key storage case 30 of the present embodiment has the same basic configuration as the first embodiment, and is different from the first embodiment in the configuration and operation of a controller 60 in a relay unit 40.

In the following description, the configuration and operation of the controller 60 will be described.

As illustrated in FIG. 6, the controller 60 includes a detector 64 and a microcomputer 62, and the microcomputer 62 outputs a driving signal to a switch 48 and a switch 50 to control on/off states of the switches 48 and 50.

Figure 7:
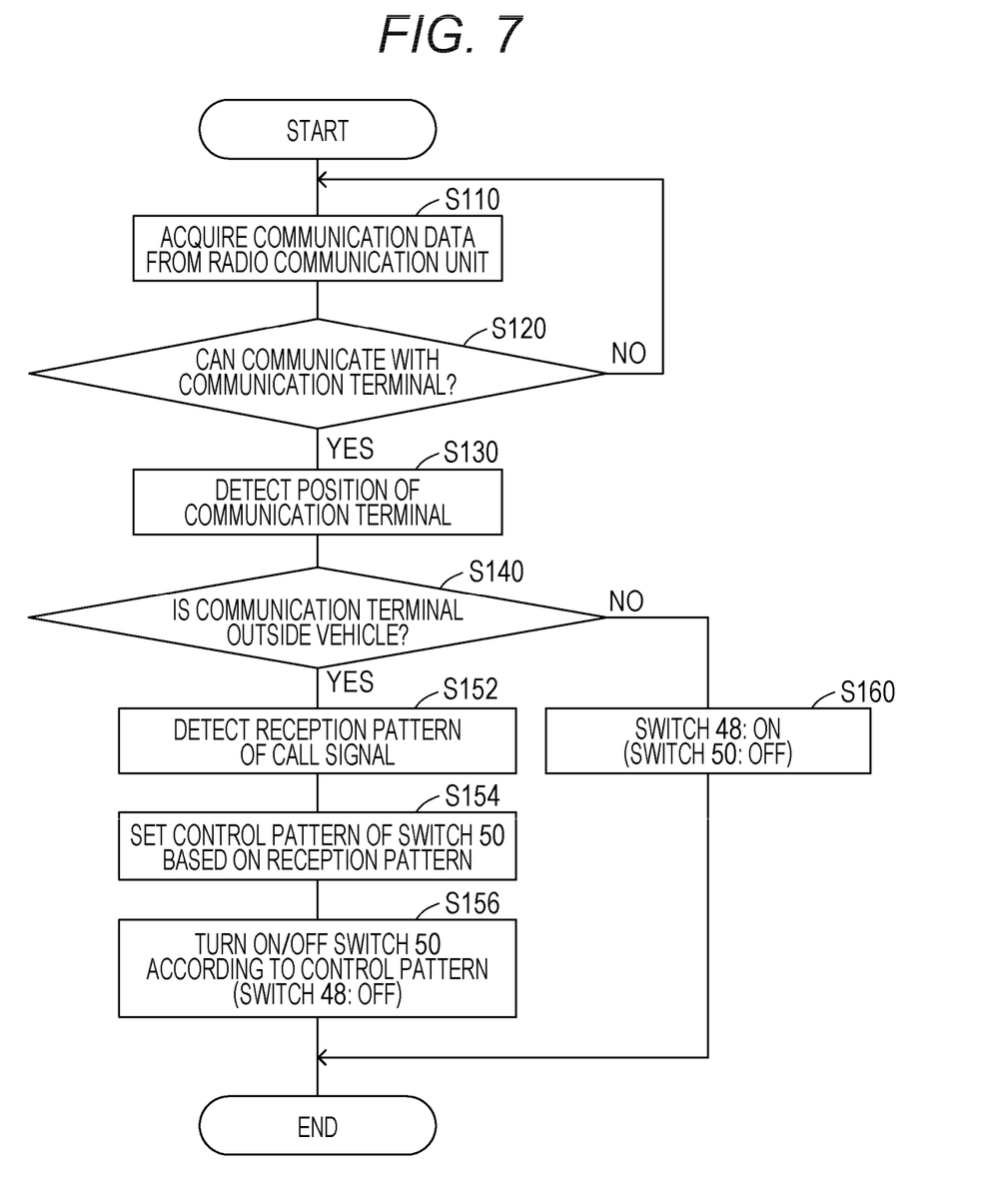
FIG. 7 is a flowchart illustrating control processing executed by a controller according to the second embodiment.

That is, in the present embodiment, the microcomputer 62 executes control processing according to the procedure illustrated in FIG. 7.

In this control processing, the microcomputer 62 executes processes of S110 to S140 in the same procedure as the control processing illustrated in FIG. 4.

When it is determined in S140 that a radio communication terminal 80 is located inside a cabin 4, the processing proceeds to S160 to turn off the switch 50 and turn on the switch 48.

As a result, when the radio communication terminal 80 is located inside the cabin 4, a call signal S1 received by a reception antenna 42 is transmitted from a transmission antenna 44 as it is. Therefore, a smart key 20 recognizes from the call signal S1 that the smart key 20 is in the cabin 4 to transmit a response signal S2 that permits the start/stop of the engine.

Then, the response signal S2 is radiated to the inside of the cabin 4 via a response signal relay section including a reception antenna 22, a transmission path 26, and a transmission antenna 24, and an in-vehicle device 10 permits an engine control device 8 to start/stop the engine according to the response signal S2.

On the other hand, when it is determined in S140 that the radio communication terminal 80 is located outside the vehicle 2, the processing proceeds to S152, and the reception pattern of the call signal S1 is detected from the level change of the call signal S1 subjected to envelope detection by the detector 64.

Then, in subsequent S154, a transmission period of the call signal S1 from the in-vehicle device 10 to the inside of the cabin 4 is recognized based on the reception pattern detected in S152, and a control pattern of the switch 50 is set so that the switch 50 is turned off only during the period to cut off the call signal S1.

In subsequent S156, the switch 50 is turned on and off according to the control pattern set in S154, so that the call signal S1, of the call signals S1 received by the reception antenna 42, transmitted from the in-vehicle device 10 to the outside of the vehicle 2 is selectively caused to pass through. In S156, the switch 48 is turned off.

As a result, when the radio communication terminal 80 is located outside the vehicle 2, only the call signal S1 transmitted from the in-vehicle device 10 to the outside of the vehicle 2 is radiated from the transmission antenna 44 as in the above embodiment.

Therefore, the smart key 20 transmits the response signal S2 corresponding to the call signal S1, and the in-vehicle device 10 permits the unlocking/locking control device 6 to unlock/lock the door in accordance with the response signal S2.

Therefore, also in the present embodiment, it is possible to switch the call signal S1 transmitted to the reception antenna 22 via the relay unit 40 between when the radio communication terminal 80 is located outside the vehicle 2 and when it is located inside the cabin 4, and it is possible to obtain an effect similar to that in the above embodiment.

Third Embodiment

Next, a smart key storage case 30 according to a third embodiment will be described.

Figure 8:
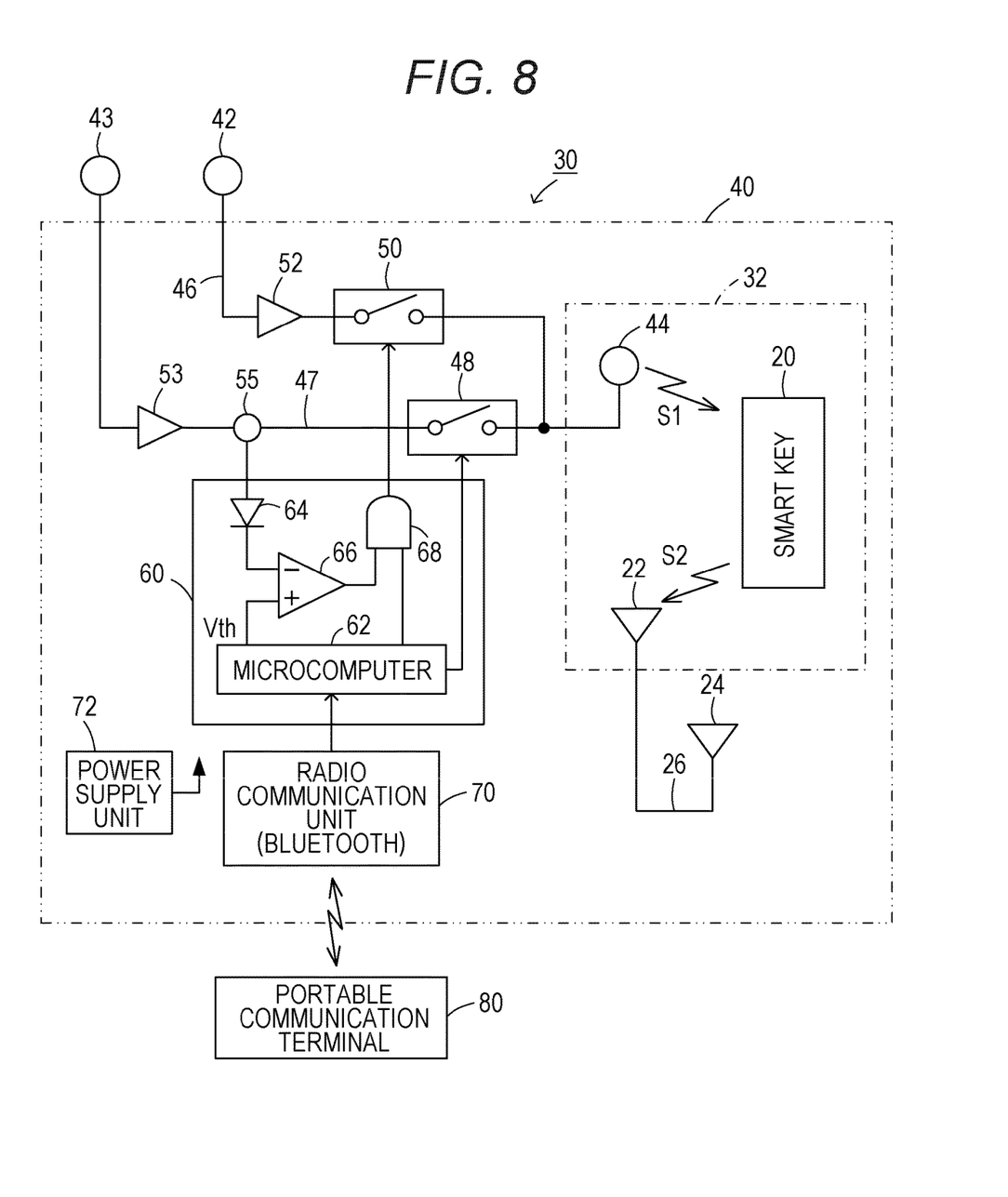
FIG. 8 is a block diagram illustrating a configuration of a relay unit of a third embodiment.

As illustrated in FIG. 8, the smart key storage case 30 of the present embodiment has the same basic configuration as the first embodiment, and is different from the first embodiment in that two reception antennas 42 and 43 are provided as reception antennas that receive a call signal S1.

As in the first embodiment, one reception antenna 42 of the two reception antennas is disposed at a position where the call signal S1 transmitted from an in-vehicle device 10 to the outside of a vehicle 2 and the inside of a cabin 4 can be received, and corresponds to an example of a first reception antenna of the present disclosure.

That is, the reception antenna 42 is disposed in the cabin at a position where the call signal S1 entering from the outside of the vehicle 2 can be received, that is, at a position close to an opening such as a windshield, a rear glass, or a door glass of the vehicle 2.

In addition, the other reception antenna 43 is disposed in the cabin 4 at a position where only the call signal S1 transmitted from the in-vehicle device 10 to the inside of the cabin 4 can be received, for example, at a position which it is difficult for the call signal S1 transmitted to the outside of the vehicle 2 to reach, such as under the seat of the vehicle 2. Note that the reception antenna 43 corresponds to an example of a second reception antenna of the present disclosure.

Then, the reception antenna 42 is connected to a transmission antenna 44 via a transmission path 46, and the reception antenna 43 is connected to a transmission antenna 44 via a transmission path 47. Note that the transmission path 46 corresponds to an example of a first transmission path of the present disclosure, and the transmission path 47 corresponds to an example of a second transmission path of the present disclosure.

In addition, the transmission path 46 is provided with an amplifier 52 and a switch 50, and the call signal S1 received by the reception antenna 42 is transmitted to the transmission antenna 44 only when the switch 50 is in the on state.

Furthermore, the transmission path 47 is provided with an amplifier 53, a branching unit 55, and a switch 48, and the call signal S1 received by the reception antenna 43 is transmitted to the transmission antenna 44 only when the switch 48 is in the on state.

In the present embodiment, the switch 48 corresponds to an example of a first switch of the present disclosure, and the switch 50 corresponds to an example of a second switch of the present disclosure.

Then, the call signal S1 branched by the branching unit 55 provided in the transmission path 47 is input to a detector 64 of a controller 60.

The controller 60 is configured in the same manner as in the first embodiment, and a microcomputer 62 executes the control processing illustrated in FIG. 4 to hold the switch 48 in the off state and perform on/off control of the switch 50 when a radio communication terminal 80 is located outside the vehicle 2. When the radio communication terminal 80 is in the cabin 4, the switch 50 is held in the off state, and the switch 48 is held in the on state.

As a result, when the radio communication terminal 80 is located outside the vehicle 2, only the call signal S1 transmitted from the in-vehicle device 10 to the outside of the vehicle 2 of the call signals S1 received by the reception antenna 42 is selectively transmitted to the transmission antenna 44.

Further, the call signal S1 transmitted from the in-vehicle device 10 to the inside of the cabin 4 and then received by the reception antenna 43 is transmitted to the transmission antenna 44.

Therefore, the smart key storage case 30 of the present embodiment can also have the same effects as the first embodiment and the second embodiment.

[Modifications]

Although the embodiments of the present disclosure are described above, the smart key storage case of the present disclosure is not limited to the above embodiments, and various modifications can be made.

For example, in the first and second embodiments, two switches 48 and 50 connected in parallel are provided in the transmission path 46 of the call signal S1, and the switch used to make the transmission path 46 in the conduction state is switched according to the position of the radio communication terminal 80.

However, one switch may be provided in the transmission path 46, and the microcomputer 62 may directly control the on/off state of the switch according to the position of the radio communication terminal 80.

Furthermore, for example, in the above-described embodiments, the radio communication unit 70 is described as performing radio communication by Bluetooth (registered trademark) with the radio communication terminal 80. However, the communication method of the radio communication only needs to be a communication method with high security, and for example, a communication method other than Bluetooth (registered trademark) such as Wi-Fi (registered trademark) may be applied.

In addition, a plurality of functions of one component in the above embodiments may be realized by a plurality of components, or one function of one component may be realized by a plurality of components. In addition, a plurality of functions of a plurality of components may be realized by one component, or one function realized by a plurality of components may be realized by one component. Part of the configuration of the above embodiments may be omitted. At least part of the configuration of the above embodiments may be added to or replaced with the configuration of another above embodiment.

The invention claimed is:

1. A smart key storage case for storing, in a cabin of a vehicle, a smart key that is a portable device of a keyless entry system of the vehicle, the smart key storage case comprising:
   a storage case main body configured to store the smart key and to shield a signal transmitted and received between an in-vehicle device and the smart key of the keyless entry system;
   a reception antenna disposed outside the storage case main body and configured to receive a call signal periodically transmitted from the in-vehicle device to an outside of the vehicle and an inside of the cabin at different timing;
   a transmission antenna disposed inside the storage case main body and configured to radiate the call signal received by the reception antenna to an inside of the storage case main body;
   a transmission path through which the call signal received by the reception antenna is transmitted to the transmission antenna;

a switch provided in the transmission path and configured to switch a conduction/cutoff state of the transmission path;

a radio communication unit configured to enable data communication with a portable radio communication terminal registered in advance outside the storage case main body;

a controller configured to, when the radio communication unit receives predetermined data transmitted from the portable radio communication terminal, turn on the switch according to a reception situation of the predetermined data to switch the transmission path from a cutoff state to a conduction state; and a response signal relay section configured to radiate a response signal transmitted from the smart key in response to the call signal radiated from the transmission antenna inside the storage case main body to an outside of the storage case main body, wherein when the predetermined data is received by the radio communication unit, the controller identifies, based on a signal strength at a time of receiving the predetermined data, whether the portable radio communication terminal is present outside the vehicle or inside the cabin, and controls an on/off state of the switch so that when the portable radio communication terminal is present inside the cabin, the switch is turned on to switch the transmission path from a cutoff state to a conduction state, and when the portable radio communication terminal is present outside the vehicle, of a plurality of the call signals received by the reception antenna, the first call signal transmitted from the in-vehicle device to an inside of the cabin is cut off, and the second call signal transmitted from the in-vehicle device to an outside of the vehicle is selectively transmitted.

2. The smart key storage case according to claim 1, wherein when the portable radio communication terminal is present outside the vehicle, the controller detects a signal strength of the call signal received by the reception antenna, turns on the switch when the signal strength is equal to or less than a predetermined threshold value, and turns off the switch when the signal strength exceeds the predetermined threshold value.

3. The smart key storage case according to claim 1, wherein when the portable radio communication terminal is present outside the vehicle, the controller recognizes a transmission period of the call signal from the in-vehicle device to an inside of the cabin from a reception pattern of the call signal received by the reception antenna, turns off the switch within the transmission period, and turns on the switch outside the transmission period.

4. The smart key storage case according to claim 1, wherein the smart key storage case comprises: as the reception antenna, a first reception antenna disposed at a position where the call signal transmitted from the in-vehicle device to an outside of the vehicle and to an inside of the cabin is allowed to be received; and a second reception antenna disposed at a position where only the call signal transmitted from the in-vehicle device to the inside of the cabin is allowed to be received, wherein the smart key storage case comprises: as the switch, a first switch provided in a first transmission path through which the call signal received by the first reception antenna is transmitted to the transmission antenna; and a second switch provided in a second transmission path through which the call signal received by the second reception antenna is transmitted to the transmission antenna, and wherein the controller is configured to, when the portable radio communication terminal is present inside the cabin, turn off the first switch and turn on the second switch to transmit the call signal in the cabin received by the second reception antenna to the transmission antenna, and when the portable radio communication terminal is present outside the vehicle, turn off the second switch, and turn off the first switch during a reception period in which the call signal in the cabin is received by the second reception antenna and turn on the first switch outside the reception period to selectively transmit the call signal transmitted from the in-vehicle device to the outside of the vehicle to the transmission antenna.

* * * * *